United States Patent
R et al.

(10) Patent No.: US 10,606,522 B2
(45) Date of Patent: Mar. 31, 2020

(54) PRINTABLE CONTENT PROVISION CAPABILITIES MESSAGES

(71) Applicant: Hewlett-Packard Development Company, L.P., Houston, TX (US)

(72) Inventors: Krishnaswamy R, Bangalore (IN); Sajal Kum Das, Bangalore (IN); Shakti Amarendra, Bangalore (IN); Anuradha Asuri, Bangalore (IN); Sivakami Velusamy, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,371

(22) PCT Filed: Jun. 15, 2017

(86) PCT No.: PCT/US2017/037741
§ 371 (c)(1),
(2) Date: Oct. 29, 2018

(87) PCT Pub. No.: WO2018/013289
PCT Pub. Date: Jan. 18, 2018

(65) Prior Publication Data
US 2019/0146723 A1    May 16, 2019

(30) Foreign Application Priority Data
Jul. 15, 2016 (IN) .............................. 201641024374

(51) Int. Cl.
*G06F 3/12* (2006.01)
(52) U.S. Cl.
CPC .......... *G06F 3/1204* (2013.01); *G06F 3/1206* (2013.01); *G06F 3/1258* (2013.01); *G06F 3/1268* (2013.01); *G06F 3/1285* (2013.01)

(58) Field of Classification Search
None
See application file for complete search history.

(56) References Cited

U.S. PATENT DOCUMENTS 8,610,938 B2 * 12/2013 Seikh .................... G06F 3/1204
358/1.13
8,896,857 B2 * 11/2014 Ganesan ............... G06F 3/1204
358/1.14

(Continued)

FOREIGN PATENT DOCUMENTS

CN    102855102 A    1/2013
CN    103116952 A    5/2013

(Continued)

OTHER PUBLICATIONS

Welcome to Industry 4.0: Supporting the Internet of Things with Print, Aug. 3, 2015, https://www.mimeo.com/ ~ 9 pages.

*Primary Examiner* — Paul F Payer
(74) *Attorney, Agent, or Firm* — HP Inc. Patent Department (57) ABSTRACT

In one example of the disclosure, a capabilities message is received from each of a set of computing devices, the capabilities message indicative of whether the computing device can provide printable content. Capabilities data, indicative of printable content provision capabilities for each of the set of computing devices, is stored. A display of printable content capabilities for the set of computing devices is caused. Responsive to a user selection of a first computing device that can provide printable content, printable content is obtained from the first computing device and printing of the printable content is caused.

15 Claims, 7 Drawing Sheets

(56) References Cited

U.S. PATENT DOCUMENTS

| | | | |
|---|---|---|---|
| 9,377,971 B2* | 6/2016 | Poirier | G06F 3/1204 |
| 2005/0099442 A1 | 5/2005 | Payne | |
| 2008/0313531 A1* | 12/2008 | Song | H04L 12/2803 |
| | | | 715/234 |
| 2009/0009802 A1 | 1/2009 | Shaw et al. | |
| 2013/0222843 A1 | 8/2013 | Ganesan et al. | |

FOREIGN PATENT DOCUMENTS

| | | |
|---|---|---|
| KR | 20150100368 A | 9/2015 |
| WO | WO2014145877 A2 | 9/2014 |
| WO | WO-2015169195 A1 | 11/2015 |

* cited by examiner

PRINTABLE CONTENT PROVISION CAPABILITIES MESSAGES

BACKGROUND

In today's world, users are increasingly utilizing technology-based devices, including smartphones, tablets, and personal computers, to wirelessly connect to household and industrial devices with embedded sensors. Such a wireless network is sometimes referred to as the Internet of Things ("IoT"). A computing device that is connected to an electronic device via the IoT may receive environmental and other data from the electronic device. The computing device may in turn utilize the received data to make determinations about the environment, and to control the electronic device and/or other electronic devices according to the determinations.

DETAILED DESCRIPTION

Many of the electronic devices that are connected via the IoT are capable of providing printable content when accessed by a computing device. For instance, various utility devices (e.g., electricity, water, heating) will have meters or sensors that, if accessed, could provide data that can be useful for printing consumption reports, forecasts, budgets, error histories for troubleshooting, etc. In another example, various IoT enabled fitness devices, if accessed, could provide useful health data. However, in many cases accessing the devices and printing the content can be a challenge as such devices often do not have a user interface, and it may not be readily apparent whether the device is capable of providing printable content. Further, even if the device is capable of providing printable content in many cases such content will not be in a print-ready format.

To address these issues, various examples described in more detail below provide an apparatus and a method that enables receipt and display of capabilities messages indicative of a set of devices that can provide printable content, and following a user selection of a first device from the set of devices, enables obtaining printable content from the first device and printing of the content.

In a first example, a printer may receive a capabilities message from each of a set of computing devices, wherein the capabilities message is indicative of whether the computing device can provide printable content. The printer may store capabilities data that is indicative of printable content provision capabilities for each of the set of computing devices and cause a display of printable content capabilities for the set of computing devices. Responsive to a user selection of a first computing device, from the set of computing devices that can provide printable content, the printer may obtain printable content from the first computing device and in turn cause printing of the printable content.

In another example, a printer may receive from a proxy computing device utilizing a first network protocol, for each of a set of devices that do not support communication with the printer via the first network protocol, a capabilities message indicative of printable content provision capabilities of the device. The printer may cause storage of capabilities data that is indicative of printable content provision capabilities for each of the set of computing devices. The printer may cause a display of printable content capabilities for the set of devices. In response to a user selection at the display of a first device that can provide printable content, the printer may send a provision request to the proxy computing device via the first network protocol. The printer may receive printable content from the proxy computing device, wherein the proxy computing device had obtained the printable content from the first device via a second network protocol. The printer may in turn cause printing of the printable content.

In this manner, then, the disclosed examples provide a communication method and apparatus that will enable a printer in an IoT environment to detect devices with printable content and enable printing of device-specific content. The disclosed examples may be utilized with standard protocols for IoT device discovery and printable information access. The disclosed examples can work with network protocols for regular internet enabled devices, and also with network protocols for resource-constrained IoT devices. Further, the disclosed examples may utilize a proxy computing device to communicate with IoT devices that do not support any of the network protocols supported by the printer. Users and providers of printers and devices connected via an IoT will appreciate the disclosed system and methods that should provide IoT printing possibilities heretofore unavailable.

Figure 1:
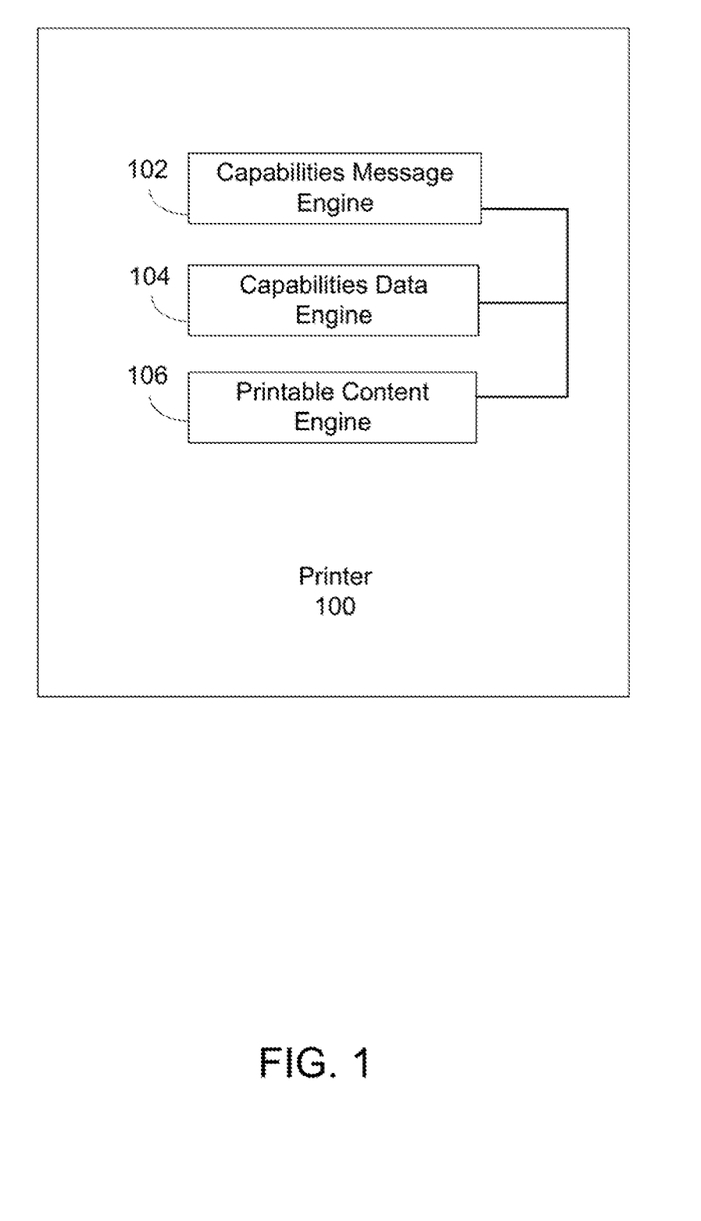
FIG. 1 is a block diagram depicting an example of a printer including hardware and programming to enable receipt of printable content provision capabilities messages.
Figure 2:
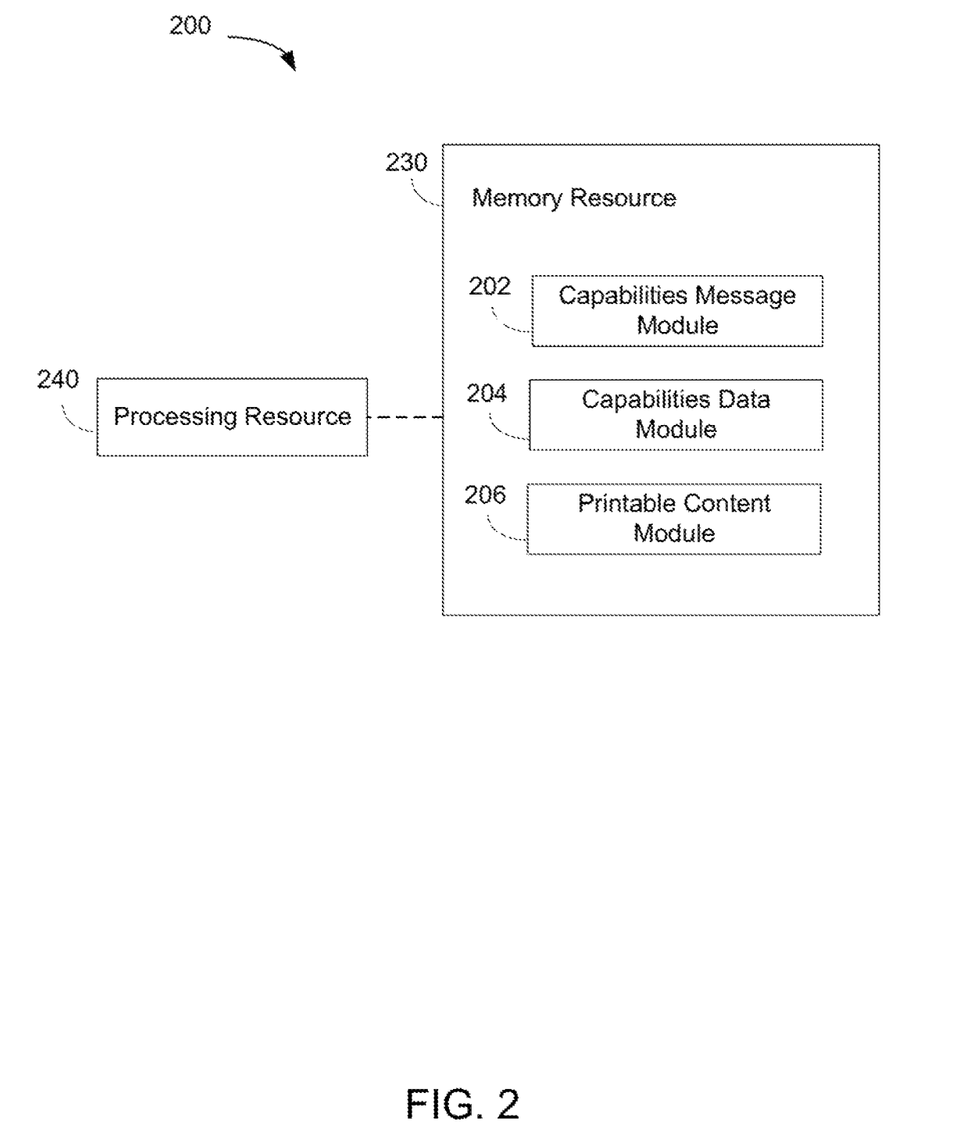
FIG. 2 is a block diagram depicting a memory resource and a processing resource to implement examples of a printer for receiving printable content provision capabilities messages.

FIGS. 1 and 2 depict examples of physical and logical components for implementing various examples. In FIG. 1 various components are identified as engines 102, 104, and 106. In describing engines 102-106 focus is on each engine's designated function. However, the term engine, as used herein, refers generally to a combination of hardware and programming to perform a designated function. As is illustrated later with respect to FIG. 2, the hardware of each engine, for example, may include one or both of a processor and a memory, while the programming may be code stored on that memory and executable by the processor to perform the designated function.

FIG. 1 is a block diagram depicting components of a printer 100 to enable receipt of printable content provision capabilities messages. In this example, printer 100 includes a capabilities message engine 102, capabilities data engine 104, and printable content engine 106. In performing their respective functions, engines 102-106 may access a data repository, e.g., a memory accessible to printer 100 that can be used to store and retrieve data. As used herein, a "printer" refers generally to any computing device configured to produce a physical printed representation of an image. In examples printer 100 may be thermal inkjet printer, a piezoelectric inkjet printer, a latex ink printer, a solid ink printer, a laser printer, a 3D printer, or any other type of printer that ejects a marking agent or marking agents to form an image. Printer 100 includes hardware and programming for providing printing functions. Printer 100 may include an operating system to cause the printer to interpret print data, and a printing element to cause the application of one or more marking agents upon a media according to mapping provided by print data, to thereby form an image upon a media. As used herein, "marking agent" refers generally to any substance that includes a pigment and can be applied upon a media by a printer during a printing operation, including but not limited to aqueous inks, solvent inks, UV-curable inks, dye sublimation inks, latex inks, liquid electrophotographic inks, liquid or solid toners, and powders. "Pigment" refers generally to a coloring matter, including, but not limited to insoluble powders, to be mixed with water, oil, or another base to produce an ink or other fluid. In examples a marking agent may be, but it is not limited to, a black marking agent with a black pigment, a cyan marking agent with a cyan pigment, a magenta marking agent with a magenta pigment, or a yellow marking agent with a yellow pigment. An "ink" refers generally to any fluid that is to be applied to a media during a printing operation.

In examples, printer 100 may be a multifunction device that can perform a function such as scanning and/or copying in addition to printing. In examples, printer 100 may be a printer located in a printing system located in a commercial print provider facility. In other examples printer 100 may be a printer located in a home. In examples, printer 100 may be a printer configured to receive communications and content for printing over a link, e.g., a cloud-based printing service.

As used herein, a "link" refers generally to an infrastructure or combination of infrastructures to enable an electronic connection, wireless connection, other connection, or combination thereof, to enable data communication between components and/or computing devices. Such infrastructure or infrastructures may include, but are not limited to, a cable, wireless, fiber optic, or remote connections via telecommunication link, an infrared link, or a radio frequency link. For example, a "link" may refer to or represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

In the example of FIG. 1, capabilities message engine 102 represents generally a combination of hardware and programming to receive, from each computing device of a set of computing devices a capabilities message for the computing device. The capabilities message is a message indicative of whether the computing device is capable of (e.g., via a push operation, or via a pull or access operation initiated by another computing device) of providing printable content to another computing device, e.g., printer 100. As used herein, a "message" refers generally to any communication that conveys information, and is not meant to be limited to text or to a character string. As used herein, "content" refers generally to any data or information that is available, e.g., by retrieval, from a computing device.

As used herein, "printable content" refers generally to content that is in a format that is, or can be converted to via a rendering operation, understandable to a printer so as to allow for printing. In examples, capabilities message engine 102 may receive the capabilities message via any networking protocol. In examples the networking protocol may include, but is not limited to, Transmission Control Protocol/Internet Protocol ("TCP/IP"), Internet Protocol version 6 ("IPv6"), IPv6 over Low power Wireless Personal Area Networks ("6LoWPAN"), Internet Protocol version 4 ("IPv4"), HyperText Transfer Protocol ("HTTP"), multicast Domain Name System ("mDNS") and/or Session Initiation Protocol ("SIP").

In examples, capabilities message engine 102 may initiate sending of a probe message to each of the computing devices of the set of computing devices, and the capabilities message may be received as a response to the probe message. In examples, the initiated probe request may be sent by printer 100, or by another computing device pursuant to an instruction received from printer 100. In other examples, capabilities message engine 102 may receive the capabilities message as part of a passive monitoring of device capabilities messages sent by the set of computing devices.

Continuing at FIG. 1, capabilities data engine 104 represents generally a combination of hardware and programming to store capabilities data indicative of the printable content provision capabilities for each of the set of computing devices. Capabilities data engine 104 causes a display of printable content capabilities for each computing device of the set of computing devices. As used herein, a "display" or "displayed" refers generally to an exhibition or presentation caused by a computer, e.g., a printer, for the purpose of perception by a user via an electronic display component. As used herein, a "display component" refers generally to a combination of hardware and programming to exhibit or present content, a message, or other information for perception by a user, and can include, but is not limited to, a visual, tactile or auditory display. In examples, capabilities data engine 104 may cause the display of printable content capabilities at a display component at printer 100. In examples, a display component at printer 100 may be, or include, a LCD display, a touchscreen, a monitor, or a projection device. In other examples, capabilities data engine 104 may cause the display of the printable content capabilities to occur at another computing device, e.g., a personal computer that is electronically connected to printer 100.

Continuing at FIG. 1, printable content engine 106 represents generally a combination of hardware and programming to, in response to a user selection of a first computing device that can provide printable content, obtain printable content from the first computing device. In a particular example, the user selection may be detected at printer 100, and may be a user selection made via user interaction with a graphic user interface display at a touchscreen display or other display component at printer 100. In another particular example, the user selection may be detected at printer 100, and may be a user selection made via user interaction with a physical button (e.g., a "Select" button), or other physical user interface at printer 100 that is not a touchscreen display component.

Continuing at FIG. 1, printable content engine 106 may obtain the printable content from the first computing device via a networking protocol. In examples the networking protocol may include, but is not limited to, Transmission Control Protocol/Internet Protocol ("TCP/IP"), Internet Protocol version 6 ("IPv6"), IPv6 over Low power Wireless Personal Area Networks ("6LoWPAN"), HyperText Transfer Protocol ("HTTP"), and/or Session Initiation Protocol ("SIP"). In an example, printable content engine 106 may obtain the printable content from the first computing device by sending a content request to the first computing device. In another example, printable content engine 106 may obtain the printable content from the first computing device via a push operation initiated at the first computing device.

Continuing at FIG. 1, following receipt of the printable content from the first computing device, printable content engine 106 is to cause printing of the printable content. In an example, printable content engine 106 may cause the printable content to be printed immediately at printer 100. In an another example, printable content engine 106 may cause the printable content to be stored, at printer 100 or a device external to printer 100, for printing at a time other than immediately after receipt from the first computing device.

In certain examples, the printable content received by printable content engine 106 is not in a print-ready format. In one example where the printable content is not in print-ready format, printable content engine 106, as part of the causing printing of the printable content, is to perform a rendering operation at the printer. In another example where the printable content is not in print-ready format, printable content engine 106 in causing printing of the printable content may send the printable content to a rendering-capable server for rendering, and printable content engine 106 in turn receives the printable content in rendered form from the rendering-capable server.

In yet another example, if the user-selected computing device is one that cannot provide printable content, printable content engine 106 may in response to such user-selection obtain device data from the second computing device that is not print-ready from the second computing device and populate a template with the device data. As used herein, a "template" refers generally to printable content in the form of an electronic document that can be adapted (e.g., adding information contained with device data, removing information contained with device data, or changing information within the document). In this example printable content engine 106 would in turn cause printing of the populated template.

Continuing at FIG. 1, in a first illustration capabilities message engine may receive a capabilities message from each of a set of computing devices utilizing a first network protocol, and the printable content engine may obtain the printable content from the first computing device utilizing the same first networking protocol. For instance, capabilities message engine 102 may receive the capabilities messages and printable content engine 106 may obtain the printable content utilizing a same IPv6 protocol. In other examples, capabilities message engine 202 may receive a capabilities message from each of a set of computing devices utilizing a first network protocol, wherein printable content engine is to obtain the printable content from the first computing device utilizing a second networking protocol that is different from the first networking protocol. For instance, capabilities message engine 102 may receive the capabilities messages utilizing a IPv6 protocol, and printable content engine 106 may obtain the printable content utilizing a 6LoWPAN or IPv4 protocol. In a particular example, capabilities message engine 202 may receive from a computing device via the first network protocol, e.g., a Ipv6 protocol, a first capabilities message that includes an address for printer 100 to utilize to access the printable content utilizing the second network protocol, e.g., a 6LoWPAN or IPv4 protocol. In this particular example, printable content engine 106 is to send a printable content provision request to the first computing device and printable content engine 106 is to receive the printable content from the first computing device via the second network protocol.

Continuing at FIG. 1, in another example (sometimes referred to herein as a "proxy example") printer 100 the capabilities message engine 102 may be constructed to enable receipt of printable content provision capabilities messages for, and printable content engine 106 may be constructed to receive printable content originating from, electronic devices that do not support direct communication with printer 100. In this proxy example of printer 100, capabilities message engine 102 may receive from a proxy computing device utilizing a first network protocol, for each of a set of devices that do not support communication with the printer via the first network protocol, a capabilities message indicative of printable content provision capabilities of the device. As used herein, a "proxy device" refers generally to any computing device that can function as an intermediary communication device as between a printer and another electronic device. In certain examples, one or more of the set of devices may not support direct communication with printer 100 for the reason that the device does not include a microcontroller, yet the proxy device is capable of obtaining a sensor reading from such device(s).

Continuing at FIG. 1 with this proxy example, capabilities data engine 104 may cause storage of capabilities data indicative of printable content provision capabilities for each of the set of computing devices, and may cause a display of printable content capabilities for each device of the set of devices. Continuing at FIG. 1 with this proxy example, printable content engine 106 may cause printer 100 to, responsive to a user selection of a first device that can provide printable content, send a provision request to the proxy computing device via the first network protocol. The proxy computing device obtains the printable content from the first device via a second network protocol and sends the printable content to printer 100. Printable content engine 106 is to receive the printable content from the proxy computing device, and in turn cause printing of the printable content.

Continuing at FIG. 1 with this proxy example, in a certain illustration, a user may select from the displayed capabilities data a device that cannot provide printable content (sometimes referred to in this paragraph as a "second device."). In response to this user selection, printable content engine 106 may send a request to the proxy computing device. The proxy computing device is to in turn obtain device data from the second device, and send the obtained device data to printer 100. Following receipt of the device data at printer 100, printable content module 106 is to cause the device data to be to be converted to printable content, and is to cause printing of the content. In a particular illustration, printable content engine causing the content to be converted to printable content includes populating a template with the obtained device data. In examples, the obtained device data may include a sensor reading, e.g., an analog or a digital value indicative of a voltage level, or a fluid level, etc. In another illustration, following the conversion of the device data to printable content, printable content module 106 causes the printable content to be rendered (e.g., rendering at printer 100, or rendering by sending to another computing device hosting a rendering service).

In the foregoing discussion of FIG. 1, engines 102-106 were described as combinations of hardware and programming. Engines 102-106 may be implemented in a number of fashions. Looking at FIG. 2 the programming may be processor executable instructions stored on a tangible memory resource 230 and the hardware may include a processing resource 240 for executing those instructions. Thus memory resource 230 can be said to store program instructions that when executed by processing resource 240 implement printer 100 of FIG. 1.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the relevant instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement printer 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

In FIG. 2, the executable program instructions stored in memory resource 230 are depicted as capabilities message module 202, capabilities data module 204, printable content module 206. Capabilities message module 202 represents program instructions that when executed by processing resource 240 may perform any of the functionalities described above in relation to capabilities message engine 102 of FIG. 1. Capabilities data module 204 represents program instructions that when executed by processing resource 240 may perform any of the functionalities described above in relation to capabilities data engine 104 of FIG. 1. Printable content module 206 represents program instructions that when executed by processing resource 240 may perform any of the functionalities described above in relation to printable content engine 106 of FIG. 1.

Figure 3:
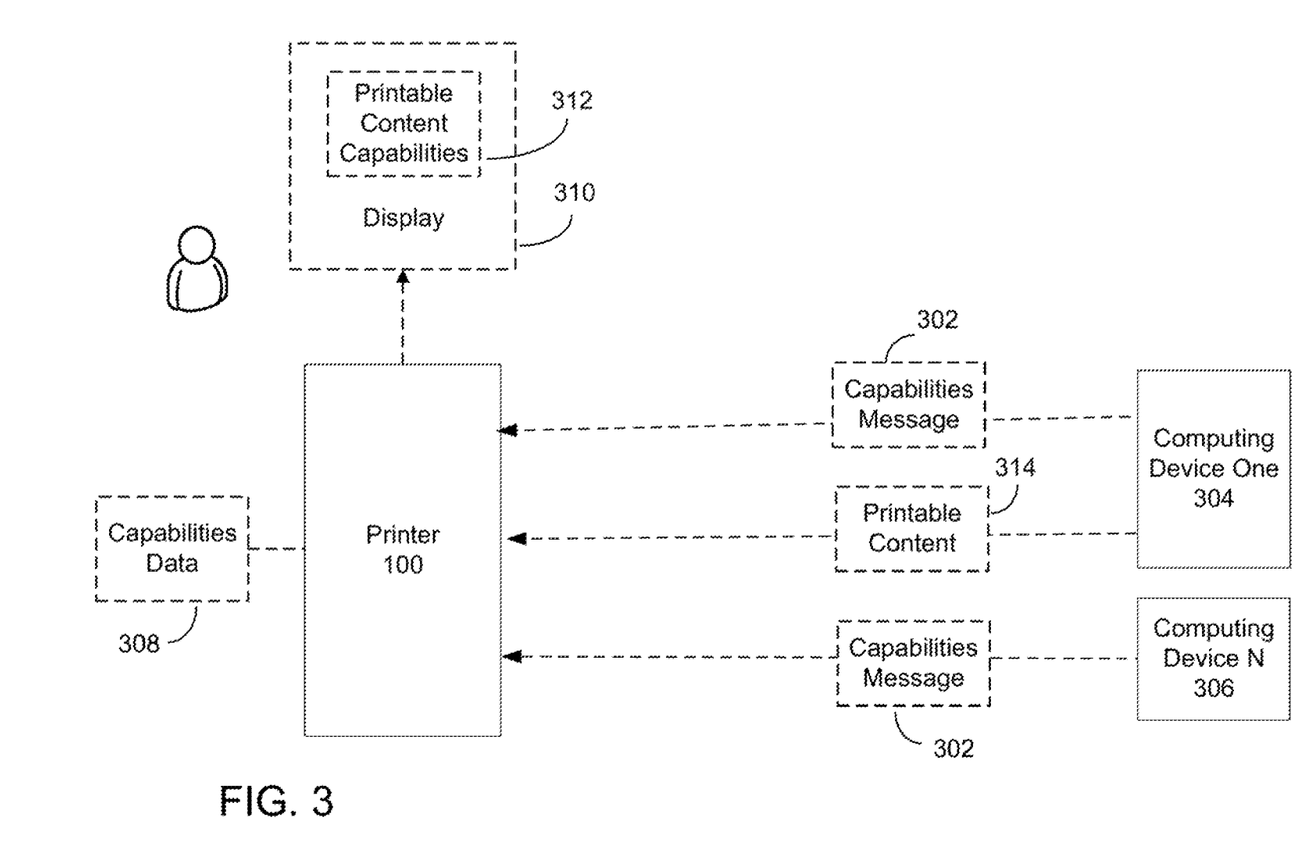
FIG. 3 illustrates an example of a printer for receiving printable content provision capabilities messages.

FIG. 3, in view of FIGS. 1 and 2, illustrates an example of a printer for receiving printable content provision capabilities messages. In an example, printer 100 is to receive a capabilities messages 302 from each of a set of computing devices that includes computing device one 304 and computing device N 306 via a link. As an illustration, computing device one 304 could be a smart thermostat for a home, and computing device N 306 could be an electronic door lock included in that same home.

Each capabilities message 306 is indicative of whether the associated computing device can provide printable content for printing at printer 100. Printer 100 is to store capabilities data 308 that is indicative of the printable content provision capabilities for each of smart thermostat computing device one 304 and the electronic door lock computing device N 306, the capabilities having been indicated by or included within capabilities messages 302. Printer 100 in turn causes a display 310 of the printable content capabilities 312 for the computing device one 304 and the computing device N 306.

In this example of FIG. 3, we assume that display 310 is indicative that the smart thermostat computing device One 304 is capable of providing a historical environmental readings printable content, and that the electronic door lock computing device one 304 is not capable of providing printable content. A user interacts with printer 100 to select the smart thermostat computing device one 304 for content printing. Printer 100, upon detecting, recognizing, or receiving the user selection, obtains the printable content 314 from the thermostat computing device one 304 via a link and causes printing of the historical environmental readings printable content printable content 314.

Figure 4:
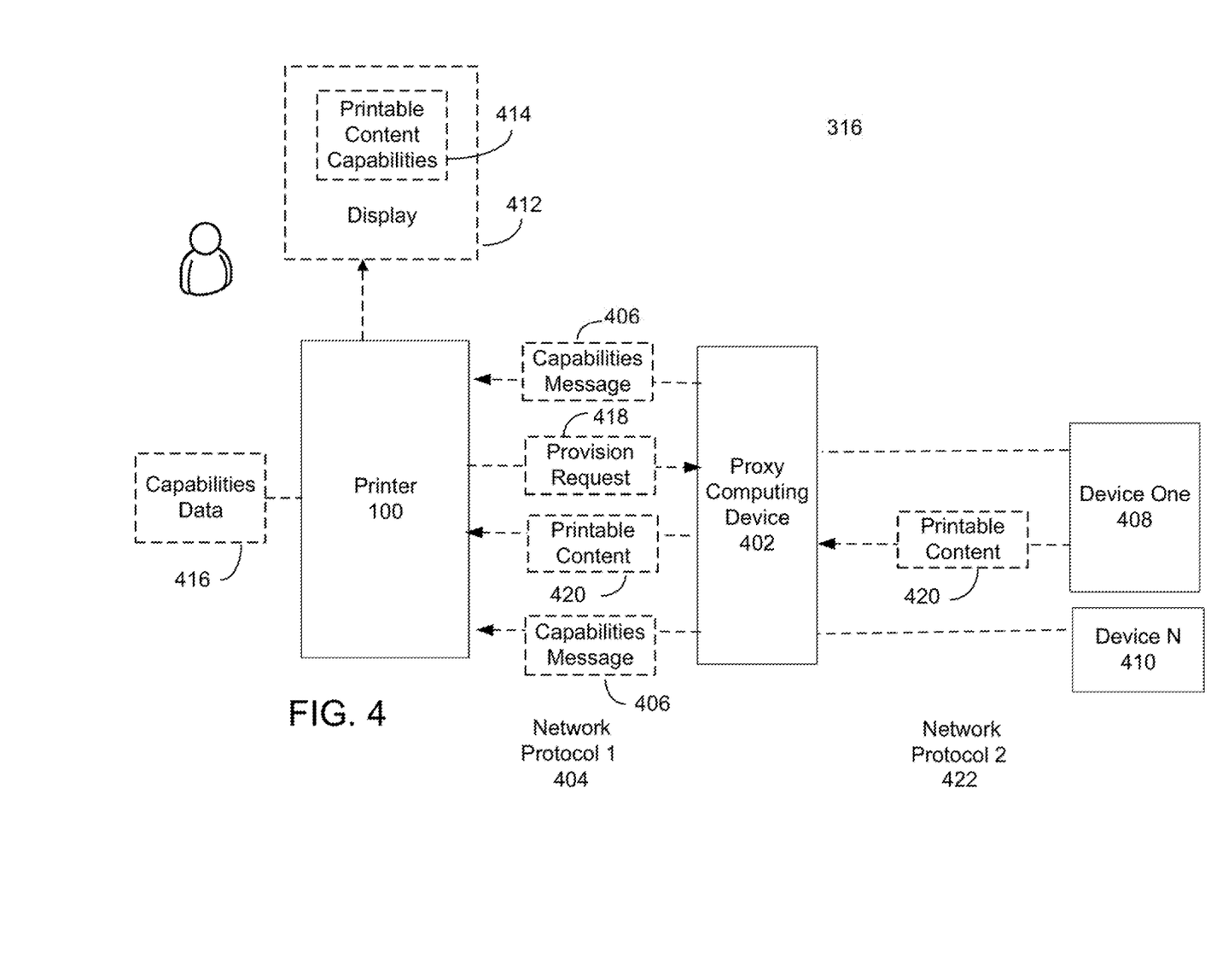
FIG. 4 illustrates another example of a printer for receiving printable content provision capabilities messages from a proxy computing device.

FIG. 4, in view of FIGS. 1, and 2, illustrates another example of a printer for receiving printable content provision capabilities messages. In an example, printer 100 is to receive from a proxy computing device 402 utilizing a first network protocol 404, for each of a set of devices that do not support communication with the printer via the first network protocol 404, the capabilities messages 406 indicative of printable content provision capabilities of each of the devices of the set. In this example, we can assume the set of computing device includes a device one 408 that is a smart oven and a device N 410 that is a water usage meter.

Printer 100 causes capabilities data 416 indicative of printable content provision capabilities for each of device one 408 and device N 410, and causes a display 412 of printable content capabilities for both device one 408 and device N 410. In this example device one 408 is indicated as having the ability to provide printable content, and device N is indicated as not having the ability to provide printable content.

A user makes a selection of device one 408 for printing content (e.g., a user interaction with the display at the printer), and printer 100 in response to receiving such selection sends a provision request 418 to the proxy computing device 402 via the first network protocol 404, and receives printable content 420 from the proxy computing device 402. The proxy computing device 402 had obtained the printable content 420 from device one 408 via a second network protocol 422. Printer 100 in turn causes printing of the printable content 420.

As discussed in previous paragraphs, in other examples, a user may select from the displayed capabilities data an electronic device that cannot provide printable content (referred to in this paragraph as a NPC device). In such an example, printer 100 may send a provision request to the proxy computing device, wherein the proxy computing device is to obtain device data from the NPC device. Following receipt of the device data printer 100 causes the device data to be converted to printable content, and in turn causes printing of the now printable content. In some examples, printer 100 may cause the device data received from the NPC device to be converted to printable content by populating a printable template with the device data, and then cause printing of the template.

Figure 5:
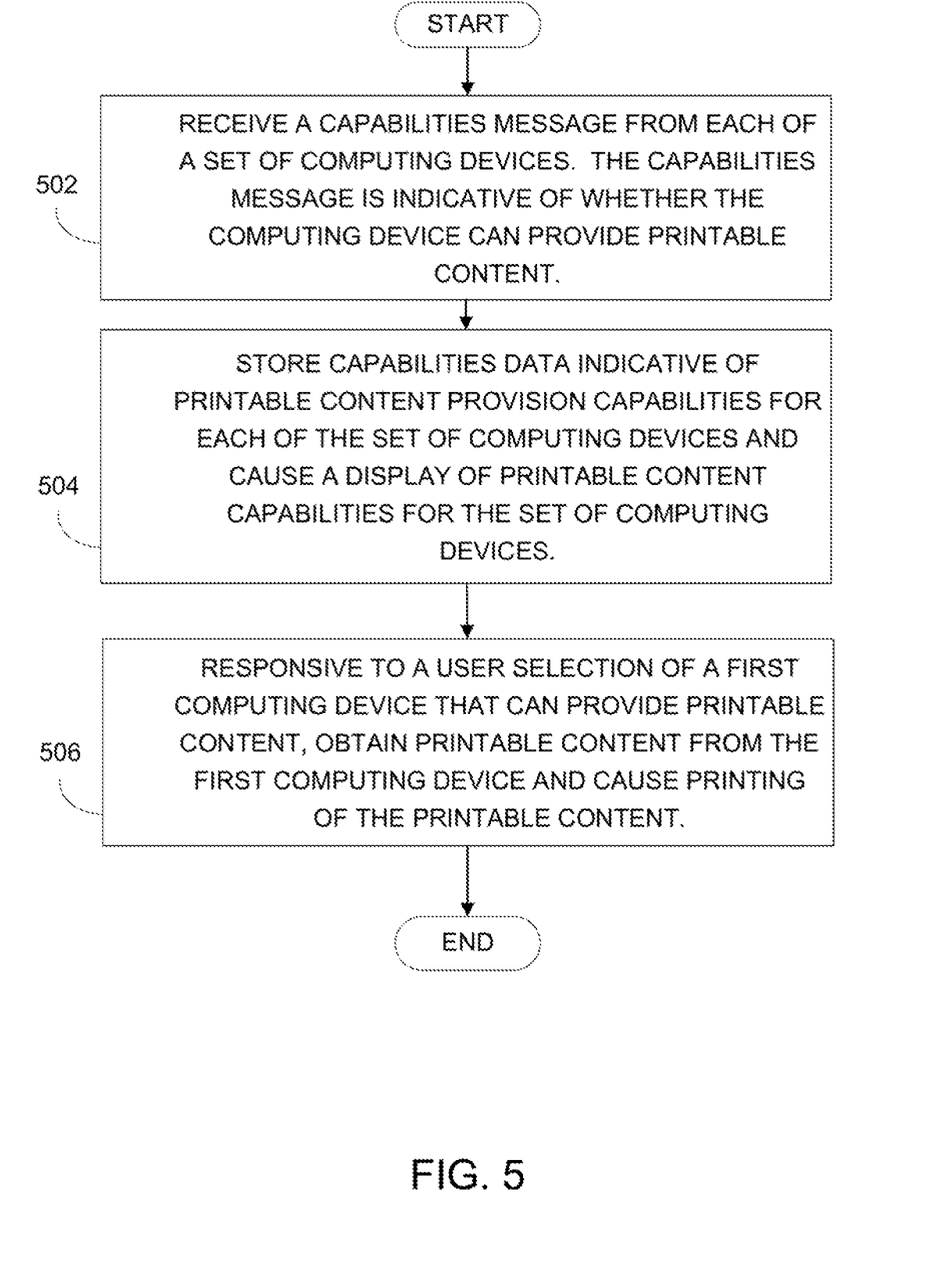
FIG. 5 is a flow diagram depicting implementation of an example of a printer for receiving printable content provision capabilities messages.

FIG. 5 is a flow diagram of implementation of a method for a printer to receive printable content provision capabilities messages In discussing FIG. 5, reference may be made to the components depicted in FIGS. 1 and 2. Such reference is made to provide contextual examples and not to limit the manner in which the method depicted by FIG. 5 may be implemented. A capabilities message is received from each of a set of computing devices. The capabilities message is indicative of whether the computing device can provide printable content (block 502). Referring back to FIGS. 1 and 2, capabilities message engine 102 (FIG. 1) or capabilities message module 202 (FIG. 2), when executed by processing resource 240, may be responsible for implementing block 502.

Capabilities data indicative of printable content provision capabilities for each of the set of computing devices is stored, and a display of printable content capabilities for the set of computing devices is caused (block 504). Referring back to FIGS. 1 and 2, capabilities data engine 104 (FIG. 1) or capabilities data module 204 (FIG. 2), when executed by processing resource 240, may be responsible for implementing block 504.

Responsive to a user selection of a first computing device that can provide printable content, printable content from the first computing device is obtained and printing of the printable content is caused (block 506). Referring back to FIGS. 1 and 2, printable content engine 106 (FIG. 1) or printable content module 206 (FIG. 2), when executed by processing resource 240, may be responsible for implementing block 506.

Figure 6:
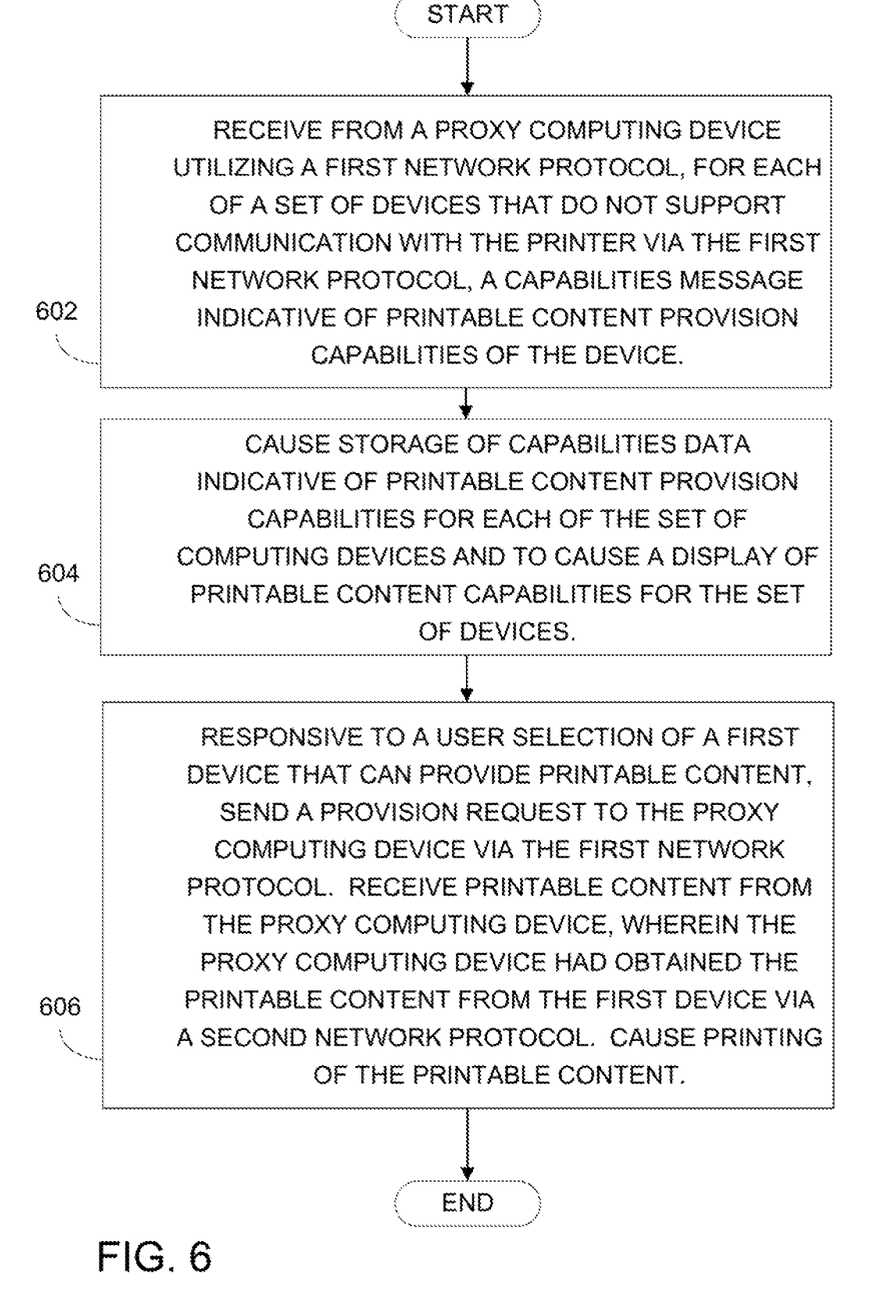
FIG. 6 is a flow diagram depicting implementation of an example of a printer for receiving printable content provision capabilities messages from a proxy computing device.

FIG. 6 is a flow diagram of implementation of a method for a printer to receive printable content provision capabilities messages from a proxy computing device. In discussing FIG. 6, reference may be made to the components depicted in FIGS. 1 and 2. Such reference is made to provide contextual examples and not to limit the manner in which the method depicted by FIG. 6 may be implemented. For each of a set of devices that do not support communication with the printer via the first network protocol, a capabilities message indicative of printable content provision capabilities of the device is received from a proxy computing device utilizing a first network protocol (block 602). Referring back to FIGS. 1 and 2, capabilities message engine 102 (FIG. 1) or capabilities message module 202 (FIG. 2), when executed by processing resource 240, may be responsible for implementing block 602.

Storage of capabilities data indicative of printable content provision capabilities for each of the set of computing devices is stored, and a display of printable content capabilities for the set of devices is caused (block 604). Referring back to FIGS. 1 and 2, capabilities data engine 104 (FIG. 1) or capabilities data module 204 (FIG. 2), when executed by processing resource 240, may be responsible for implementing block 604.

Responsive to a user selection of a first device that can provide printable content, a provision request is sent to the proxy computing device via the first network protocol. Printable content is received from the proxy computing device, wherein the proxy computing device had obtained the printable content from the first device via a second network protocol. Printing of the printable content is caused (block 606). Referring back to FIGS. 1 and 2, printable content engine 106 (FIG. 1) or printable content module 206 (FIG. 2), when executed by processing resource 240, may be responsible for implementing block 606.

Figure 7:
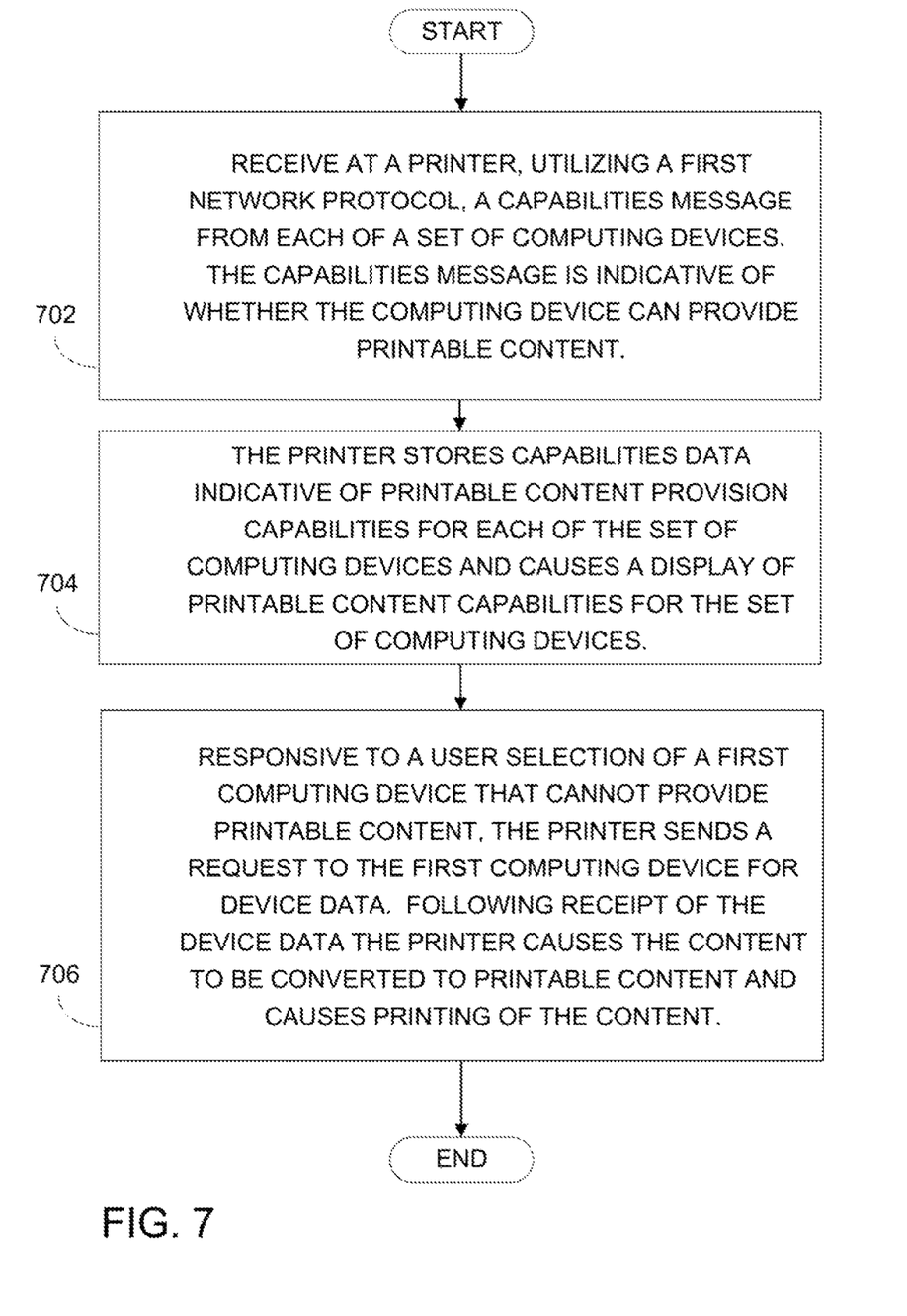
FIG. 7 is a flow diagram depicting implementation of an example of a printer for receiving printable content provision capabilities messages, the example including the printer receiving device data from a device that cannot provide printable content and the printer causing the content to be converted to printable content.

FIG. 7 is a flow diagram of implementation of a method for a printer to receive printable content provision capabilities messages, method including the printer receiving device data from a device that cannot provide printable content and the printer causing the content to be converted to printable content. In discussing FIG. 7, reference may be made to the components depicted in FIGS. 1 and 2. Such reference is made to provide contextual examples and not to limit the manner in which the method depicted by FIG. 7 may be implemented. A capabilities message from each of a set of computing devices is received at a printer utilizing a first network protocol. The capabilities message is indicative of whether the computing device can provide printable content (block 702). Referring back to FIGS. 1 and 2, capabilities message engine 102 (FIG. 1) or capabilities message module 202 (FIG. 2), when executed by processing resource 240, may be responsible for implementing block 702.

The printer stores capabilities data indicative of printable content provision capabilities for each of the set of computing devices and causes a display of printable content capabilities for the set of computing devices (block 704). Referring back to FIGS. 1 and 2, capabilities data engine 104 (FIG. 1) or capabilities data module 204 (FIG. 2), when executed by processing resource 240, may be responsible for implementing block 704.

Responsive to a user selection of a first computing device that cannot provide printable content, the printer sends a request to the first computing device for device data. Following receipt of the device data the printer causes the content to be converted to printable content and causes printing of the content (block 706). Referring back to FIGS. 1 and 2, printable content engine 106 (FIG. 1) or printable content module 206 (FIG. 2), when executed by processing resource 240, may be responsible for implementing block 706.

FIGS. 1-7 aid in depicting the architecture, functionality, and operation of various examples. In particular, FIGS. 1 and 2 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function (s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagrams of FIGS. 5-7 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:

1. A printer, comprising:
a capabilities message engine, to receive a capabilities message from each of a set of computing devices, the capabilities message indicative of whether the computing device can provide printable content;
a capabilities data engine, to store capabilities data, indicative of printable content provision capabilities for each of the set of computing devices and to cause a display of printable content capabilities for the set of computing devices; and
a printable content engine, to, responsive to a user selection of a first computing device that can provide printable content, obtain printable content from the first computing device and cause printing of the printable content.

2. The printer of claim 1, wherein the capabilities message engine is to receive a capabilities message from each of a set of computing devices utilizing a first network protocol, and the printable content engine is to obtain the printable content from the first computing device utilizing a second networking protocol.

3. The printer of claim 2, wherein the capabilities message engine is to receive a first capabilities message including an address for the printer to utilize to access the printable content utilizing the second network protocol, and wherein the printable content engine is to send a printable content provision request to the first computing device and receive the printable content from the first computing device via the second network protocol.

4. The printer of claim 1, wherein the printable content engine causing printing of the printable content includes performing a rendering operation at the printer.

5. The printer of claim 1, wherein the printable content engine causing printing of the printable content includes sending the printable content to a rendering-capable server for rendering and receiving the printable content in rendered form from the rendering-capable server.

6. The printer of claim 1, wherein the printable content engine, responsive to a user selection of a second computing device that cannot provide printable content, is to obtain device data from the second computing device, populate a template with the device data, and cause printing of the template.

7. A memory resource storing instructions that when executed cause a processing resource at a printer to effect a printing operation, the instructions comprising:
a capabilities message module that when executed causes the processing resource to receive from a proxy computing device utilizing a first network protocol, for each of a set of devices that do not support communication with the printer via the first network protocol, a capabilities message indicative of printable content provision capabilities of the device;
a capabilities data module that when executed causes the processing resource to cause storage of capabilities data indicative of printable content provision capabilities for each of the set of devices and to cause a display of printable content capabilities for the set of devices; and
a printable content module that when executed causes the processing resource to cause the printer to, responsive to a user selection of a first device that can provide printable content, send a provision request to the proxy computing device via the first network protocol, and to receive printable content from the proxy computing device, wherein the proxy computing device had obtained the printable content from the first device via a second network protocol, and wherein the printable content module is to cause printing of the printable content.

8. The memory resource of claim 7, wherein responsive to a user selection from the displayed capabilities data of a second device that cannot provide printable content, the printable content module when executed is to cause the processing resource to send a request to the proxy computing device, wherein the proxy computing device is to obtain device data, and following receipt of the device data the printable content module when executed is to cause the processing resource to cause the device data to be converted to printable content and to cause printing of the content.

9. The memory resource of claim 8, wherein, following the conversion of the device data to printable content the printable content module when executed is to cause the processing resource to cause the printable content to be rendered.

10. The memory resource of claim 8, wherein the printable content module causing the device data to be converted to printable content and causing printing of the content includes causing the processing resource to populate a template with the device data and cause printing of the template.

11. The memory resource of claim 7, wherein a first device of the set of devices is a device without a microcontroller, and the proxy computing device is to obtain a sensor reading from the first device.

12. The memory resource of claim 11, wherein the sensor reading could be analog or digital values such as one from the set of a voltage reading and a fluid level reading.

13. A method, comprising:
receiving at a printer, utilizing a first network protocol, a capabilities message from each of a set of computing devices, the capabilities message indicative of whether the computing device can provide printable content;
the printer storing capabilities data indicative of printable content provision capabilities for each of the set of computing devices and causing a display of printable content capabilities for the set of computing devices; and
responsive to a user selection of a first computing device that cannot provide printable content, the printer sending a request to the first computing device for device data, and following receipt of the device data causing the content to be converted to printable content and causing printing of the content.

14. The method of claim 13, further comprising the printer initiating sending of a probe message to a set of computing devices via the first network protocol, and wherein the capabilities message is received as a response to the probe message.

15. The method of claim 13, wherein the display of printable content capabilities for a computing device includes one from the set of the computing device can provide printable content that is in a print-ready format, the computing device can provide printable content that is not in print-ready format but can be rendered into a print-ready format, and the computing device cannot provide printable content.

\* \* \* \* \*